(12) United States Patent
Jung

(10) Patent No.: US 9,712,566 B2
(45) Date of Patent: Jul. 18, 2017

(54) PROVIDING SESSION IDENTIFIERS

(75) Inventor: Sukho Jung, Seongnam-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 709 days.

(21) Appl. No.: 13/575,815

(22) PCT Filed: Feb. 10, 2012

(86) PCT No.: PCT/US2012/024627
§ 371 (c)(1),
(2), (4) Date: Jul. 27, 2012

(87) PCT Pub. No.: WO2013/119244
PCT Pub. Date: Aug. 15, 2013

(65) Prior Publication Data
US 2013/0212290 A1    Aug. 15, 2013

(51) Int. Cl.
*H04L 29/06* (2006.01)

(52) U.S. Cl.
CPC ...... *H04L 65/1066* (2013.01); *H04L 65/1069* (2013.01)

(58) Field of Classification Search
CPC .................. H04L 65/1066; H04L 65/1069
See application file for complete search history.

(56) References Cited

U.S. PATENT DOCUMENTS

| | | | | |
|---|---|---|---|---|
| 6,662,299 B1 * | 12/2003 | Price, III | ................ | G06F 21/31 713/171 |
| 6,938,085 B1 * | 8/2005 | Belkin et al. | ................ | 709/227 |
| 7,099,946 B2 * | 8/2006 | Lennon et al. | ................ | 709/227 |
| 7,281,128 B2 * | 10/2007 | Mikel et al. | ................ | 713/155 |
| 7,809,843 B1 * | 10/2010 | Denninghoff et al. | ....... | 709/228 |
| 7,873,825 B2 * | 1/2011 | Jokela et al. | ................ | 713/153 |
| 8,386,575 B2 * | 2/2013 | Takase et al. | ................ | 709/206 |
| 8,572,268 B2 * | 10/2013 | Wray | ................ | 709/229 |
| 2001/0007127 A1 * | 7/2001 | Staring | ................ | H04L 9/12 713/160 |
| 2002/0141365 A1 * | 10/2002 | Leung | ................ | 370/335 |
| 2002/0199119 A1 | 12/2002 | Dunnion et al. | | |
| 2003/0055887 A1 * | 3/2003 | Mitreuter et al. | ........... | 709/203 |
| 2003/0079143 A1 * | 4/2003 | Mikel | ................ | H04L 63/0428 726/8 |
| 2004/0017916 A1 * | 1/2004 | Staddon | ................ | H04L 9/0833 380/277 |
| 2004/0024881 A1 * | 2/2004 | Elving et al. | ................ | 709/227 |

(Continued)

OTHER PUBLICATIONS

Luke Murphy, "Secure Session Management: Preventing Security Voids in Web Applications" Sans Institute 2005, pp. 1-28.
(Continued)

*Primary Examiner* — Joe Chacko
(74) *Attorney, Agent, or Firm* — Brundidge & Stanger, P.C.

(57) ABSTRACT

Technologies are generally described for providing a session identifier. In some examples, a method performed under control of a first device includes generating information including at least a part of a next session identifier to be used in a next session between the first device and a second device and transmitting the information to the second device. The next session follows a present session between the first device and the second device.

22 Claims, 11 Drawing Sheets

(56) References Cited

U.S. PATENT DOCUMENTS

| | | | |
|---|---|---|---|
| 2005/0261985 A1* | 11/2005 | Miller et al. | 705/26 |
| 2006/0251075 A1* | 11/2006 | Tams et al. | 370/392 |
| 2006/0259931 A1* | 11/2006 | Kikkoji et al. | 725/100 |
| 2006/0294241 A1* | 12/2006 | Cherian et al. | 709/227 |
| 2007/0124477 A1* | 5/2007 | Martin | 709/226 |
| 2007/0160048 A1* | 7/2007 | Faucheux et al. | 370/390 |
| 2008/0183887 A1* | 7/2008 | Klemets | H04L 29/06 709/231 |
| 2008/0282125 A1* | 11/2008 | Hafeez | H04L 1/1845 714/748 |
| 2009/0138606 A1 | 5/2009 | Moran et al. | |
| 2009/0177778 A1* | 7/2009 | Turk | 709/227 |
| 2010/0023625 A1 | 1/2010 | Lee et al. | |
| 2010/0131655 A1* | 5/2010 | Berry et al. | 709/227 |
| 2011/0013519 A1* | 1/2011 | Chang et al. | 370/241 |
| 2011/0055627 A1 | 3/2011 | Zawacki et al. | |
| 2011/0170545 A1 | 7/2011 | Zheng et al. | |
| 2011/0291808 A1* | 12/2011 | Meindl | 340/10.1 |
| 2014/0032491 A1* | 1/2014 | Neerincx et al. | 707/610 |

OTHER PUBLICATIONS

International Search Report and Written Opinion from International Application No. PCT/US12/24627 mailed May 18, 2012.

\* cited by examiner ined herein;

PROVIDING SESSION IDENTIFIERS

CROSS-REFERENCE TO RELATED APPLICATION

This application is the U.S. National Stage filing under 35 U.S.C. §371 of International Application No. PCT/US2012/024627, filed on Feb. 10, 2012.

BACKGROUND

A "session" is a continuous (non-permanent) connection between a user device and a server over a fixed period of time. In one conventional technique, a unique identification number is assigned to each user device which requests to communicate with a server so that the server can identify the user device in subsequent communications. The unique identification number is typically referred to as a session identifier (hereafter, "session ID"). There are, however, drawbacks associated with a security of the session ID, such as when the session ID is leaked.

SUMMARY

In an example, a method performed under control of a first device may include generating information including at least a part of a next session identifier to be used in a next session between the first device and a second device and transmitting the information to the second device. The next session follows a present session between the first device and the second device.

In an example, a server may include a receiving unit configured to receive a request for establishing a present session from a user device, a session identifier generating unit configured to generate a present session identifier to establish the present session between the server and the user device, an information generating unit configured to generate information including at least one field of at least one of a plurality of next session identifiers to be used respectively in a plurality of next sessions following the present session (each of the plurality of next session identifiers consisting of a plurality of fields), a transmitting unit configured to transmit the information to the user device, a determination unit configured to determine whether the user device requesting for establishing the present session has a same session identifier as the present session identifier and a session initiating unit configured to establish the present session upon determining that the user device has the same session identifier as the present session identifier.

In an example, a user device may include a requesting unit configured to make a request for establishing a present session between a server and the user device, a session identifier generating unit configured to generate a present session identifier to establish the present session between the server and the user device, an information generating unit configured to generate information including at least one field of at least one of a plurality of next session identifiers to be used in a plurality of next sessions following the present session (each of the plurality of next session identifier consisting of a plurality of fields), a transmitting unit configured to transmit the present session identifier and the information to the server and a session initiating unit configured to establish the present session between the server and the user device.

In an example, a computer-readable storage medium having stored thereon computer-executable instructions that, in response to execution, cause a first device to perform operations include generating information including at least a part of a next session identifier to be used in a next session between the first device and a second device and transmitting the information to the second device. The next session following a present session between the first device and the second device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
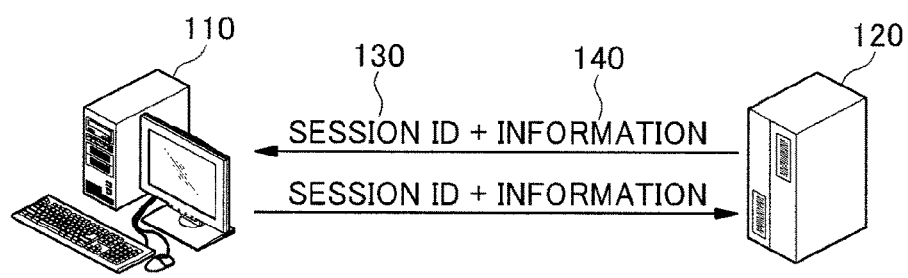
FIG. 1A schematically shows an illustrative example of an environment in which a user device is connected to a server so that a session is established between the user device and the server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to providing a session ID for use in a communication session between a user device and a server.

Technologies are generally described for a method for providing a session ID with improved security.

In some examples, a server may transmit, to a user device, information including a part of a next session ID required for connection of a next session. The user device may receive, over several sessions, split parts of the next session ID to be used in the next session, so that the user device may generate the next session ID based on the split parts of the next session ID. Since the server does not transmit the whole part of the next session ID to the user device at one time (i.e., at one session), leakage of the next session ID may be avoided.

FIG. 1A schematically shows an illustrative example of an environment in which a user device is connected to a server so that a session is established between the user device and the server in accordance with at least some embodiments described herein.

As depicted in FIG. 1A, a user device 110 is connected to a server 120 so that a present session is established therebetween. In order to establish the present session, user device 110 may make a request for establishing the present session to server 120. In response to the request for establishment of the present session from user device 110, server 120 may transmit a session ID 130 to user device 110. User device 110 may store session ID 130 received from server 120.

Figure 1B:
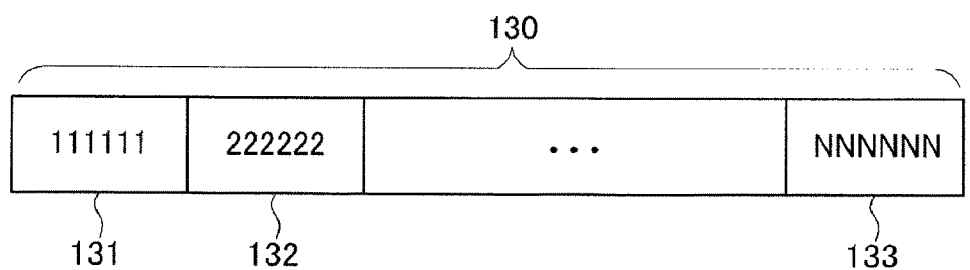
FIG. 1B shows an illustrative example of a structure of a session ID, arranged in accordance with at least some embodiments described herein.

FIG. 1B shows an illustrative example of a structure of session ID 130 in accordance with at least some embodiments described herein. As shown in FIG. 1B, session ID 130 may consist of multiple fields. By way of example, but not limitation, session ID 130 may consist of multiple fields, i.e., from a first field 131 including G-bit information of '111111' and a second field 132 including 6-bit information of '222222' to an Nth field 133 including 6-bit information of 'NNNNNN.' In the description herein, although 6-bit information is included in each single field of session ID 130, the present disclosure may not be limited thereto. The number of bits included in a single field may be equal to or larger than 1.

Referring back to FIG. 1A, server 120 may transmit session ID 130 necessary for establishing the present session to user device 110, and, at the same time, may also transmit information 140 including a part of a next session ID to be used for establishing a next session. Since the next session ID has multiple fields, information 140 may include at least one field of the next session ID. User device 110 may store therein information 140 received from server 120. User device 110 may generate the next session ID based on the stored information 140 and use the generated next session ID for the establishment of the next session. Information 140 will be described in further detail with reference to FIGS. 2B to 5C.

Further, user device 110 may transmit session ID 130 to server 120 in order to establish the present session. Server 120 may authenticate user device 110 by checking session ID 130 sent from user device 110. When session ID 130 sent from user device 110 is authenticated, the present session may be established between user device 110 and server 120.

In some embodiments, when user device 110 transmits session ID 130 to server 120, it may concurrently transmit, to server 120, information 140 including at least a part of the next session ID. Server 120 may store therein information 140 received from user device 110. Since server 120 may receive information 140 from user device 110, it may generate the next session ID which may also be sent from user device 110. Server 120 may compare the next session ID generated by itself with the next session ID sent from user device 110 and determine whether they are identical. If they are identical, the next session may be established between user device 110 and server 120.

Figure 2A:
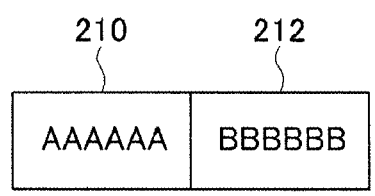
FIGS. 2A and 2B show an illustrative example of information transmitted between a user device and a server, arranged in accordance with at least some embodiments described herein.
Figure 2B:
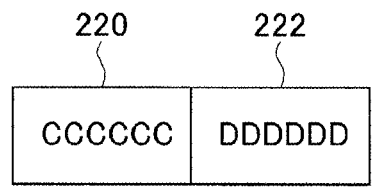
Figure 2C:
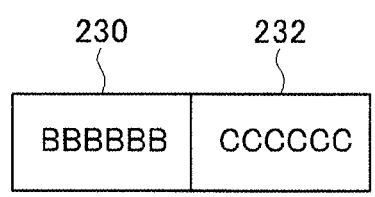
FIG. 2C shows an illustrative example of a next session ID, arranged in accordance with at least some embodiments described herein.

FIGS. 2A and 2B show an illustrative example of information transmitted between a user device and a server in accordance with at least some embodiments described herein. FIG. 2C shows an illustrative example of a next session ID in accordance with at least some embodiments described herein. Specifically, FIG. 2A illustrates information transmitted between user device 110 and server 120 when a present session is established between user device 110 and server 120, FIG. 2B illustrates information transmitted between user device 110 and server 120 when a next session is established between user device 110 and server 120, and FIG. 2C illustrates a next session ID to be used to establish another next session occurring after the next session between user device 110 and server 120.

Herein, the present session will be referred to as a Kth session. The next session established after the Kth session will be referred to as a (K+1)th session, and the next session established after the (K+1)th session will be referred to as a (K+2)th session. Further, although the session ID may consist of multiple fields, it may be assumed in FIGS. 2A to 2C that the session IDs for the Kth, (K+1)th and (K+2th) sessions consist of two fields, although the embodiments herein are in no way limited to such quantity.

As shown in FIG. 2A, when the Kth session is established between user device 110 and server 120, server 120 may transmit the information including a field 210 and a field 212 to user device 110. For example, but not as a limitation, 6-bit (i.e., 'AAAAAA') included in field 210 may be used as a part of a (K+1)th session ID necessary for establishing the (K+1)th session. Further, 6-bit (i.e., 'BBBBBB') included in field 212 may be used as a part of a (K+2)th session ID necessary for establishing the (K+2)th session.

As shown in FIG. 2B, when the (K+1)th session is established between user device 110 and server 120, server 120 may transmit the information including a field 220 and a field 222 to user device 110. For example, but not as a limitation, 6-bit (i.e., 'CCCCCC') included in field 220 may be used as a part of the (K+2)th session ID necessary for establishing the (K+2)th session. Further, 6-bit (i.e., 'DDDDDD') included in field 222 may be used as a part of a (K+3)th session ID necessary for establishing a (K+3)th session.

As shown in FIG. 2C, the (K+2)th session ID necessary for establishing the (K+2)th session may include a field 230 and a field 232. Field 230 may correspond to the 6-bit included in field 212 of the information transmitted at the Kth session and field 232 may correspond to the 6-bit included in field 220 of the information transmitted at the (K+1)th session. In this way, user device 110 may receive split parts of the (K+2)th session ID from the information of the Kth session and the information of the (K+1)th session.

It has been described that session IDs consist of two fields, and the two fields of the (K+2)th session ID are received by being included in the information of the Kth session and the information of the (K+1) session, respectively. Similarly, in case that session IDs consist of N number of fields, the N number of fields of the (K+N)th session ID may be received by being included in the information of the Kth session to a (K+N−1)th session respectively.

Although it has been described that field 212 of the information of the Kth session corresponds to field 230 of the (K+2)th session ID and that field 220 of the information of the (K+1)th session corresponds to field 232 of the (K+2)th session ID, a configuration scheme for the next session identifier may not be limited thereto. By way of example, but not as a limitation, the (K+2)th session ID may be configured contrary to FIG. 2C (i.e., field 230 corresponds to field 220 and field 232 correspond to field 212).

Further, although it has been described that the (K+2)th session ID is generated from the information of the Kth session and the information of the (K+1)th session, the present disclosure may not be limited thereto. By way of example, but not as a limitation, the (K+2)th session ID may be generated from information transmitted at a (K−2)th session and information transmitted at a (K−1)th session.

Figure 3A:
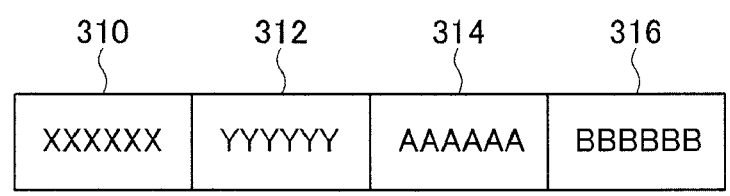
FIGS. 3A to 3C show an illustrative example of combinations of session IDs and information transmitted between a user device and a server, arranged in accordance with at least some embodiments described herein.
Figure 3B:
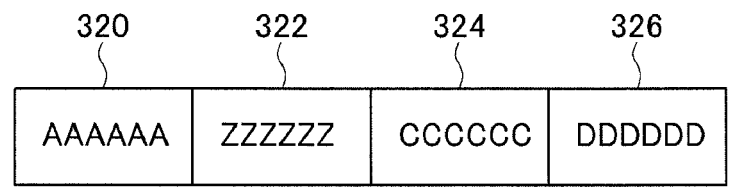
Figure 3C:
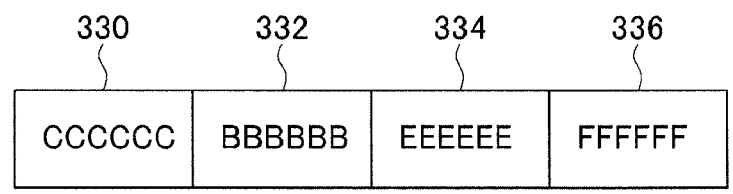

FIGS. 3A to 3C show an illustrative example of combinations of session IDs and information transmitted between a user device and a server in accordance with at least some embodiments described herein. FIG. 3A illustrates a combination of a Kth session ID and information transmitted between user device 110 and server 120 when a Kth session is established therebetween. FIG. 3B illustrates a combination of a (K+1)th session ID and information transmitted between user device 110 and server 120 when a (K+1)th session is established therebetween. FIG. 3C illustrates a combination of a (K+2)th session ID and information transmitted between user device 110 and server 120 when a (K+2)th session is established therebetween.

As depicted in FIG. 3A, when the Kth session is established between user device 110 and server 120, server 120 may transmit the Kth session ID and information to user device 110. The combination of the Kth session ID and information transmitted from server 120 to user device 110 may include fields 310 to 316. For example, but not as a limitation, the Kth session ID may consist of fields 310 and 312, and the information thereof may consist of fields 314 and 316. The G-bit (i.e., 'AAAAAA') included in field 314 may be used as a part of the (K+1)th session ID necessary for establishing the (K+1)th session. Further, the 6-bit (i.e., 'BBBBBB') included in field 316 may be used as a part of the (K+2)th session ID necessary for establishing the (K+2) th session. Meanwhile, as for the Kth session ID, 6-bit (i.e., 'XXXXXX') included in field 310 may be included in information transmitted from server 120 to user device 110 at a (K−2)th session and 6-bit (i.e., 'YYYYYY') included in field 312 may be included in information transmitted from server 120 to user device 110 at a (K−1)th session.

As depicted in FIG. 3B, the combination of the (K+1)th session ID and information transmitted from server 120 to user device 110 may include fields 320 to 326. For example, but not as a limitation, the (K+1)th session ID may consist of fields 320 and 322, and the information thereof may consist of fields 324 and 326. Field 320 of the (K+1)th session ID (i.e., 'AAAAAA') may correspond to field 314 of the information transmitted from server 120 to user device 110 at the Kth session, and field 322 of the (K+1)th session ID (i.e., 'ZZZZZZ') may correspond to a field included in information transmitted from server 120 to user device 110 at the (K−1)th session. Further, 6-bit included in field 324 (i.e., 'CCCCCC') may be used as a part of the (K+2)th session ID necessary for establishing the (K+2)th session, and 6-bit included in field 326 (i.e., 'DDDDDD') may be used as a part of a (K+3)th session ID necessary for establishing a (K+3)th session.

As shown in FIG. 3C, the combination of the (K+2)th session ID and information transmitted from server 120 to user device 110 may include fields 330 to 336. For example, but not limitations, the (K+2)th session ID may consist of fields 330 and 332, and the information thereof may consist of fields 334 and 336. Field 330 of the (K+2)th session ID (i.e., 'CCCCCC') may correspond to field 324 of the information transmitted from server 120 to user device 110 at the (K+1)th session, and field 332 of the (K+2)th session ID (i.e., BBBBBB') may correspond to field of 316 of the information transmitted from server 120 to user device 110 at the Kth session. Further, 6-bit included in field 334 (i.e., 'EEEEEE') may be used as a part of the (K+3)th session ID necessary for establishing the (K+3)th session, and 6-bit included in field 336 (i.e., 'FFFFFF') may be used as a part of a (K+4)th session ID necessary for establishing a (K+4)th nest session.

As described above, server 120 may transmit parts of next session IDs (i.e., the (K+1)th session ID and (K+2)th session ID) together with the present session ID (i.e., the Kth session ID) to user device 110. Accordingly, user device 110 may generate the next session IDs necessary for establishing the next sessions.

It has been described that server 120 transmits to user device 110 the information including parts of the next session IDs together with the Kth session ID. However, in some embodiments, it may also be possible that user device 110 may transmit to server 120 the information including parts of the next session IDs together with the Kth session ID. In such cases, server 120 may generate the next session IDs that would be received from user device 110 when user device 110 makes a request for establishing the next sessions. Further, server 120 may establish the next sessions between user device 110 and server 120 after determining that the next session IDs generated by server 120 coincide with the next session IDs transmitted from user device 110.

Figure 4A:
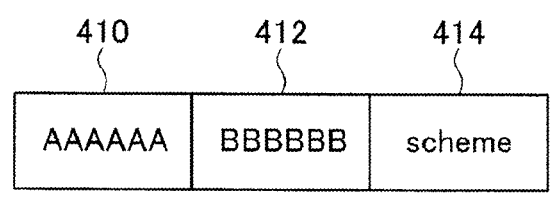
FIGS. 4A and 4B show another illustrative example of information transmitted between a user device and a server, arranged in accordance with at least some embodiments described herein.
Figure 4B:
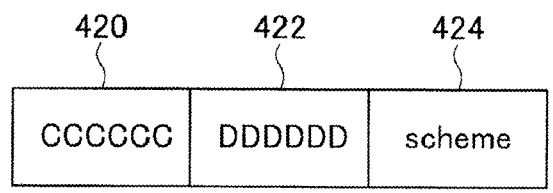

FIGS. 4A and 4B show another illustrative example of information transmitted between a user device and a server in accordance with at least some embodiments described herein. FIG. 4A shows information transmitted from server 120 to user device 110 when a Kth session is established between user device 110 and server 120. FIG. 4B shows information transmitted from server 120 to user device 110 when a (K+1)th session is established between user device 110 and server 120.

As shown in FIG. 4A, the information transmitted from server 120 to user device 110 when the Kth session is established between user device 110 and server 120 may include fields 410 to 414. For example, but not as a limitation, 6-bit (i.e., 'AAAAAA') included in field 410 may be used as a part of a (K+1)th session ID necessary for establishing the (K+1)th session. Further, 6-bit (i.e., 'BBBBBB') included in field 412 may be used as a part of a (K+2)th session ID necessary for establishing a (K+2)th session. Further, field 414 may include a configuration scheme for the next session IDs. The configuration scheme included in field 414 may indicate how the 12-bits (i.e., 'AAAAAA' and 'BBBBBB') included in fields 410 and 412 will be used to generate the (K+1)th session ID and the (K+2)th session ID. By way of example, but not limitations, the configuration scheme included in field 414 may indicate that the 6-bit (i.e., 'AAAAAA') of field 410 may be arranged in the first field of the (K+1)th session ID and the 6-bit (i.e., 'BBBBBB') of field 412 may be arranged in the second field of the (K+2)th session ID.

As depicted in FIG. 4B, the information transmitted from server 120 to user device 110 when the (K+1)th session is established between user device 110 and server 120 may include fields 420 to 424. For example, but not as a limitation, 6-bit (i.e., 'CCCCCC') included in field 420 may be used as a part of the (K+2)th session ID necessary for establishing the (K+2)th session. Further, 6-bit (i.e., 'DDDDDD') included in field 422 may be used as a part of a (K+3)th session ID necessary for establishing a (K+3)th session. Further, field 424 may include a configuration scheme for the next session IDs. The configuration scheme included in field 424 may indicate how the 12-bits (i.e., 'CCCCCC' and 'DDDDDD') included in fields 420 and 422 will be used to generate the (K+2)th session ID and the (K+3)th session ID. By way of example, but not as a limitation, the configuration scheme included in field 424 may indicate that the 6-bits (i.e., 'CCCCCC') of field 420 may be arranged in the first field of the (K+2)th session ID and the 6-bits (i.e., 'DDDDDD') of field 422 may be arranged in the second field of the (K+3)th session ID.

Figure 5A:
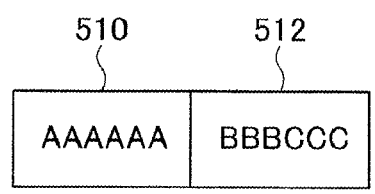
FIGS. 5A and 5B show another illustrative example of information transmitted between a user device and a server, arranged in accordance with at least some embodiments described herein.
Figure 5B:
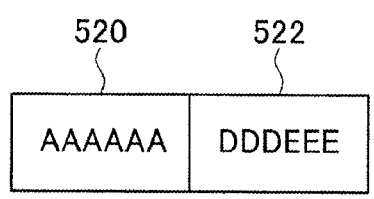
Figure 5C:
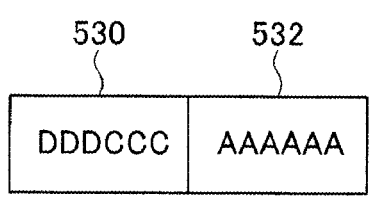
FIG. 5C shows another illustrative example of a next session ID, arranged in accordance with at least some embodiments described herein.

FIGS. 5A and 5B show another illustrative example of information transmitted between a user device and a server in accordance with at least some embodiments described herein. Specifically, FIG. 5A shows information transmitted between server 120 and user device 110 when a Kth session is established between user device 110 and server 120. FIG. 5B shows information transmitted between server 120 and user device 110 when a (K+1)th session is established between user device 110 and server 120. FIG. 5C shows another illustrative example of a next session ID in accordance with at least some embodiments described herein. Specifically, FIG. 5C illustrates a (K+2)th session ID used to establish a (K+2)th session between user device 110 and server 120.

As depicted in FIG. 5A, the information transmitted from server 120 to user device 110 when the Kth session is established between user device 110 and server 120 may include fields 510 and 512. For example, but not as a limitation, 6-bit (i.e., 'AAAAAA') included in field 510 may be used as a part of the (K+2)th session ID necessary for establishing the (K+2)th session. Further, a part of 6-bit (i.e., 'BBBCCC') included in field 512 may be used as a part of the (K+2)th session ID necessary for establishing the (K+2)th session.

As shown in FIG. 5B, the information transmitted from server 120 to user device 110 when the (K+1)th session is established between user device 110 and server 120 may include fields 520 and 522. For example, 6-bit (i.e., 'AAAAAA') included in field 520 may be used as a part of the (K+2)th session ID necessary for establishing the (K+2)th session. Further, a part of 6-bit (i.e., 'DDDEEE') included in field 522 may be used as a part of the (K+2)th session ID necessary for establishing the (K+2)th session.

As depicted in FIG. 5C, the (K+2)th session ID necessary for establishing the (K+2)th session may include fields 530 and 532. For example, but not as a limitation, field 530 may include a part (i.e., 'CCC') of the-6 bits (i.e., 'BBBCCC') included in field 512 of the information transmitted at the Kth session and a part (i.e., 'DDD') of the 6-bit (i.e., 'DDDEEE') included in field 522 of the information transmitted at the (K+1)th session. Further, field 532 may include the G-bit (i.e., AAAAAA') included in field 510 of the information transmitted at the Kth session or the 6-bit (i.e., 'AAAAAA') included in field 520 of the information transmitted at the (K+1)th session.

Figure 6:
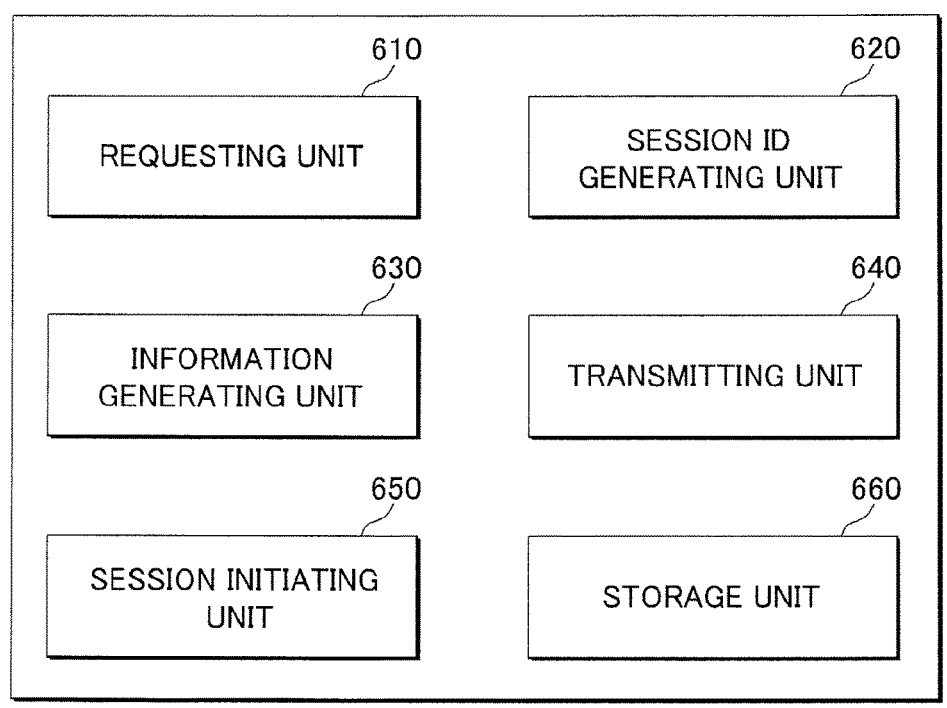
FIG. 6 shows a schematic block diagram illustrating an example architecture for a user device, arranged in accordance with at least some embodiments described herein.

FIG. 6 shows a schematic block diagram illustrating an example architecture for a user device in accordance with at least some embodiments described herein. As depicted in FIG. 6, user device 110 may include a requesting unit 610, a session identifier generating unit 620, an information generating unit 630, a transmitting unit 640, a session initiating unit 650 and a storage unit 660. Although illustrated as discrete components, various components may be divided into additional components, combined into fewer components, or eliminated altogether while being contemplated within the scope of the disclosed subject matter.

Requesting unit 610 may make a request for establishing a present session (i.e., Kth session) between user device 110 and server 120. Requesting unit 610 may transmit the request for establishing the present session to server 120. At this time, user device 110 may have a present session ID (i.e., Kth session ID) generated by session identifier generating unit 620, as will be described later.

Session identifier generating unit 620 may generate the present session ID necessary for establishing the present session.

Information generating unit 630 may generate information including a part of a next session ID necessary for establishing a next session. By way of example, but not as a limitation, information generating unit 630 may generate the information illustrated in FIGS. 2A, 2B, 3A, 3B, 3C, 4A, 4B, 5A and 5B. Further, each of the present session ID and next sessions ID may consist of multiple fields. For example, but not as a limitation, each of the present session ID and next session IDs may consist of two or more fields as illustrated in FIGS. 2C, 3A to 3C and 5C.

Transmitting unit 640 may transmit the present session ID generated by session identifier generating unit 620 and the information generated by information generating unit 630 to server 120. At this time, transmitting unit 640 may transmit the present session ID and the information to server 120 in a form of a single data packet.

Session initiating unit 650 may establish and maintain a session connection between server 120 and user device 110. Storage unit 660 may store therein the present session ID and information transmitted to server 120.

Figure 7:
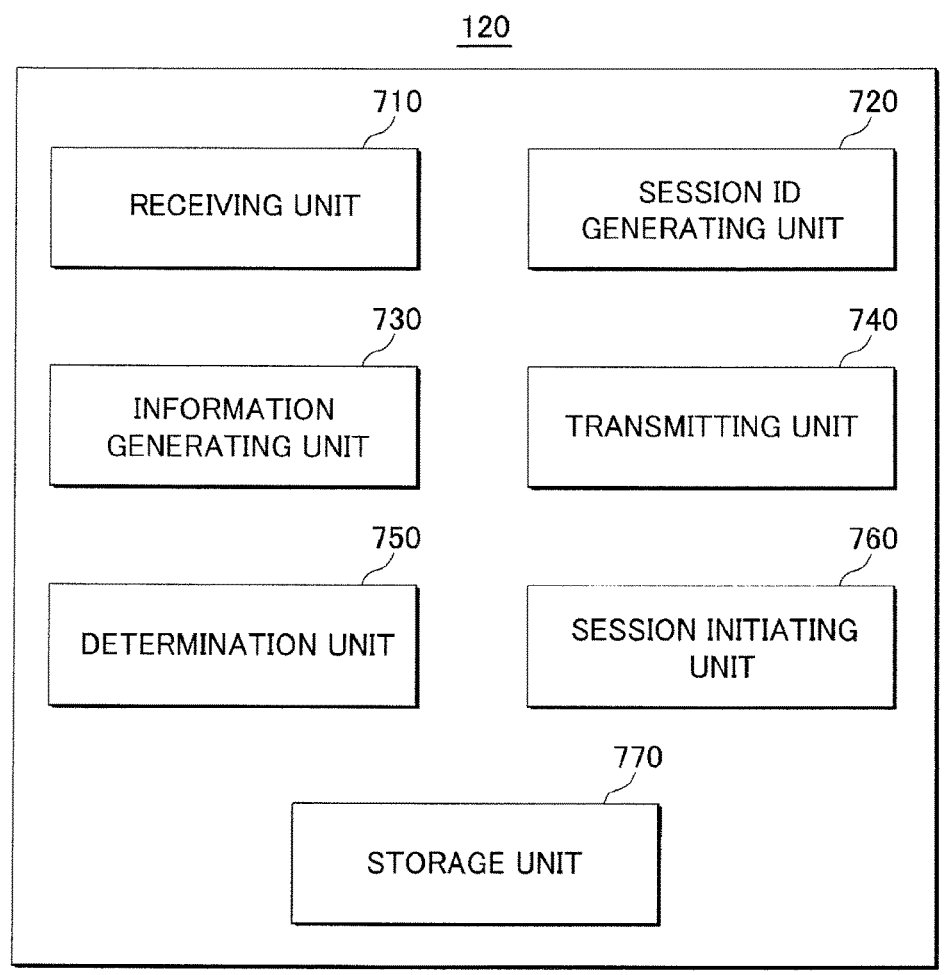
FIG. 7 shows a schematic block diagram illustrating an example architecture for a server, arranged in accordance with at least some embodiments described herein.

FIG. 7 shows a schematic block diagram illustrating an example architecture for a server in accordance with at least some embodiments described herein. As depicted in FIG. 7, server 120 may include a receiving unit 710, a session identifier generating unit 720, an information generating unit 730, a transmitting unit 740, a determination unit 750, a session initiating unit 760 and a storage unit 770. Although illustrated as discrete components, various components may be divided into additional components, combined into fewer components, or eliminated altogether while being contemplated within the scope of the disclosed subject matter.

Receiving unit 710 may receive, from user device 110, a request for establishing a present session (i.e., Kth session) between user device 110 and server 120. User device 110 may have a present session ID (i.e., Kth session ID) generated by session identifier generating unit 720, which will be described later. Further, user device 110 may have a present session ID generated by itself based on information generated by information generating unit 730, which will be described later.

Session identifier generating unit 720 may generate the present session ID necessary for establishing the present session.

Information generating unit 730 may generate information including a part of a next session ID necessary for establishing a next session. For example, but not as a limitation, information generating unit 730 may generate the information illustrated in FIGS. 2A, 2B, 3A, 3B, 3C, 4A, 4B, 5A and 5B. Further, each of the present session ID and next session IDs may consist of multiple fields. By way of example, but not as a limitation, each of the present session ID and the next session IDs may consist of two or more fields, as depicted in FIGS. 2C, 3A to 3C and 5C.

When receiving unit 710 receives the request for establishing the present session, transmitting unit 740 may transmit, to user device 110, the present session ID generated by session identifier generating unit 720 and the information generated by information generating unit 730. At this time, transmitting unit 740 may transmit the present session ID and information, in a form of a single data packet.

Determination unit 750 may determine whether user device 110 has the same session ID as the present session ID generated by session identifier generating unit 720. Further, determination unit 750 may also determine whether user device 110 has the same session ID as the present session ID generated based on the information generated by information generating unit 730.

When it is determined that user device 110 has the same session ID as the present session ID generated by session identifier generating unit 720 or the same session ID as the present session ID generated based on the information generated by information generating unit 730, session initiating unit 760 may establish and maintain a session between server 120 and user device 110.

Storage unit 770 may store the present session ID and information sent to user device 110.

Figure 8:
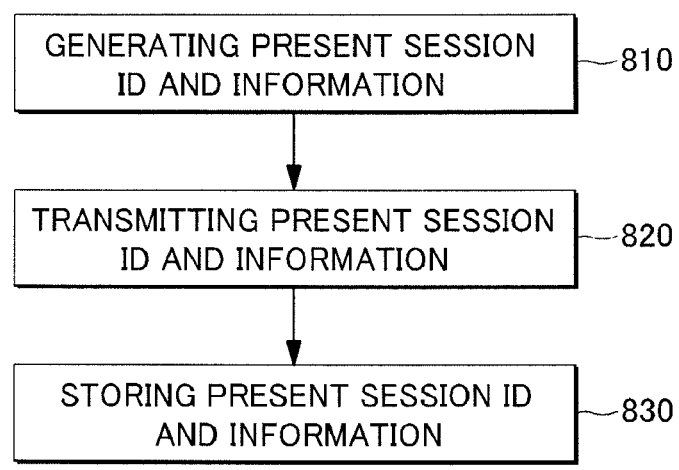
FIG. 8 shows an example flow diagram of a process of a user device for generating and transmitting a present session identifier and information, arranged in accordance with at least some embodiments described herein.

FIG. 8 shows an example flow diagram of a process of a user device for generating and transmitting a present session identifier and information in accordance with at least some embodiments described herein. The process in FIG. 8 may be implemented in user device 110 including requesting unit 610, session identifier generating unit 620, information generating unit 630, transmitting unit 640, session initiating unit 650 and storage unit 660 discussed above. An example process may include one or more operations, actions, or functions as illustrated by one or more blocks 810, 820 and 830. Although illustrated as discrete blocks, various blocks may be divided into additional blocks, combined into fewer blocks, or eliminated, depending on the desired implementation. Processing may begin at block 810.

At block 810, user device 110 may generate a present session ID necessary for establishing a present session between user device 110 and server 120. Further, at block 810, user device 110 may generate information including a part of a next session ID necessary for establishing a next session. User device 110 may generate the present session ID and information at the same time or in sequence. Processing may continue from block 810 to block 820.

At block 820, user device 110 may transmit the present session ID and information generated at block 810 to server 120. At this time, user device 110 may transmit the present session ID and information to server 120 in a form of a single data packet. Server 120 may authenticate user device 110 based on the present session ID received from user device 110. Further, since user device 110 transmits the information including a part of the next session ID to server 120, server 120 may be informed of the next session ID for the next session to be transmitted from user device 110. Processing may continue from block 820 to block 830.

At block 830, user device 110 may store, in storage unit 660, the present session ID and information transmitted to server 120 at block 820.

Figure 9:
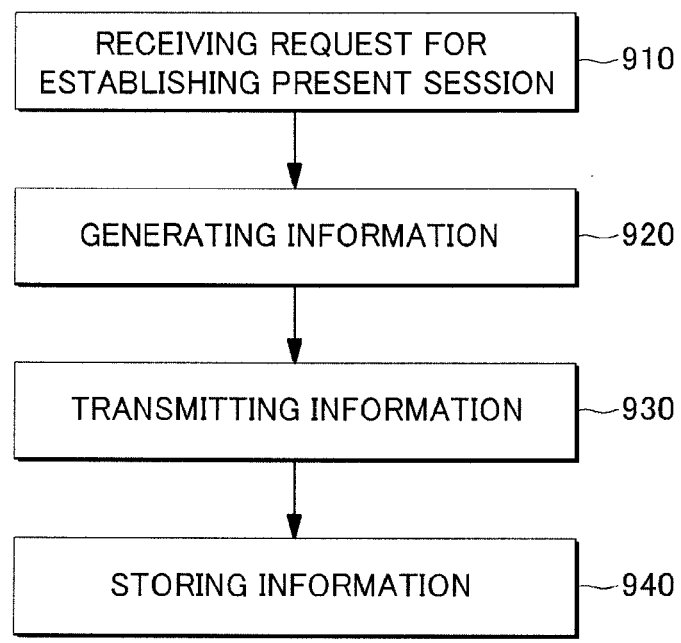
FIG. 9 shows an example flow diagram of a process of a server for generating and transmitting information, arranged in accordance with at least some embodiments described herein.

FIG. 9 shows an example flow diagram of a process of a server for generating and transmitting information in accordance with at least some embodiments described herein. The process in FIG. 9 may be implemented in server 120 including receiving unit 710, session identifier generating unit 720, information generating unit 730, transmitting unit 740, determination unit 750, session initiating unit 760 and storage unit 770 discussed above. An example process may include one or more operations, actions, or functions as illustrated by one or more blocks 910, 920, 930 and 940. Although illustrated as discrete blocks, various blocks may be divided into additional blocks, combined into fewer blocks, or eliminated, depending on the desired implementation. Processing may begin at block 910.

At block 910, server 120 may receive a request for establishing a present session between user device 110 and server 120 from user device 110. As described earlier, user device 110 may have a present session ID generated by session identifier generating unit 720 or a present session ID generated by user device 110 based on the information generated by information generating unit 730. Processing may continue from block 910 to block 920.

At block 920, server 120 may generate information including a part of a next session ID necessary for establishing a next session. Processing may continue from block 920 to block 930.

At block 930, server 120 may transmit the information generated at block 920 to user device 110. Further, at block 930, server 120 may generate a present session ID and transmit the generated present session ID to user device 110. Processing may continue from block 930 to block 940.

At block 940, server 120 may store, in a storage unit 770, the information transmitted to user device 110 at block 930. Further, in case that server 120 generates and transmits the present session ID, server 120 may also store the present session ID in storage unit 770.

A server may generate information including a part of a next session ID to be used for establishing a next session and transmit the information to a user device. The user device may receive the information, over several sessions established before the next session, from the server. Accordingly, the user device may receive split parts of the next session ID to be used in the next session over the several sessions, so that the user device may generate the next session ID based on the split parts of the next session ID.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
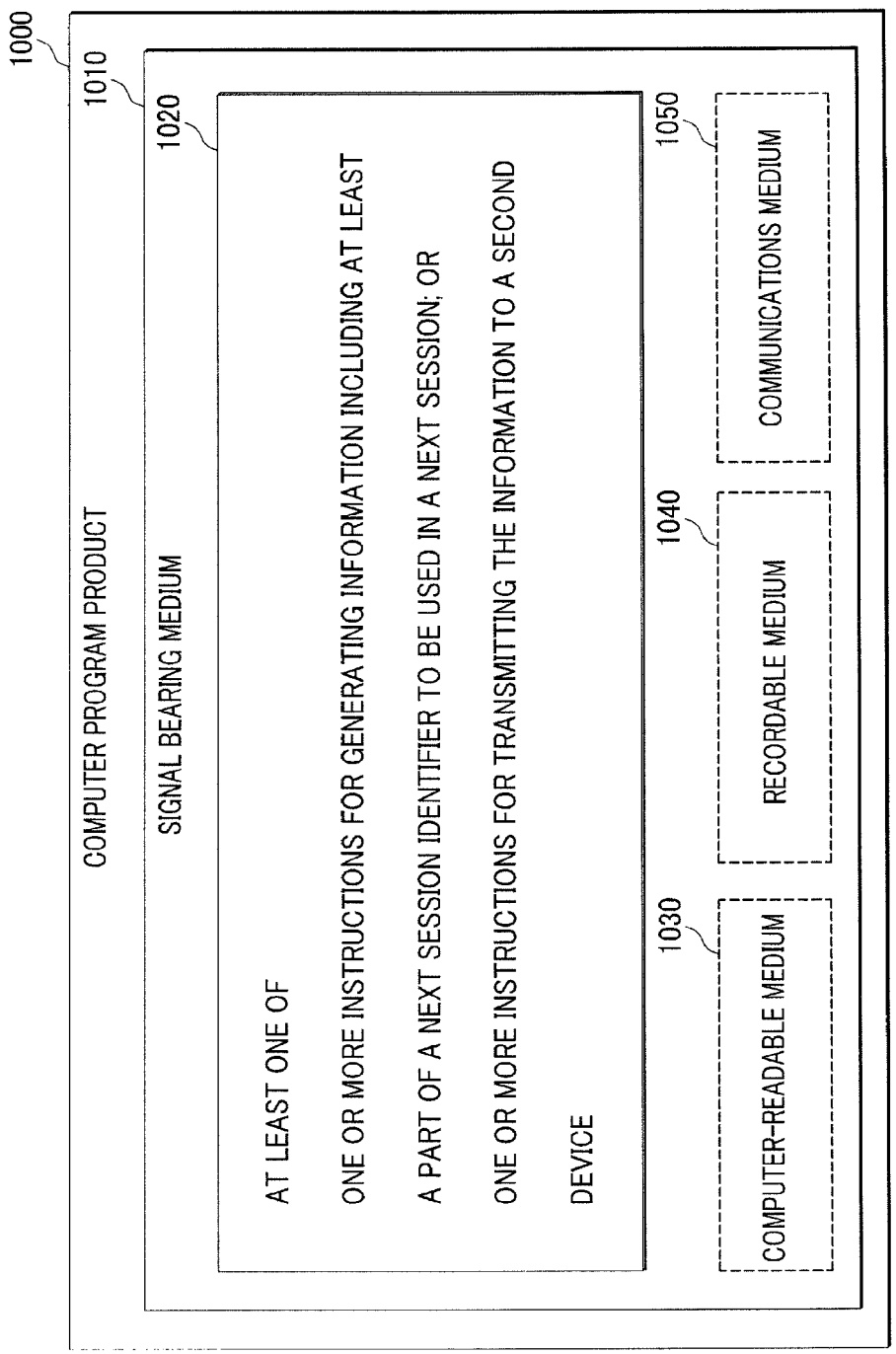
FIG. 10 illustrates computer program products that can be utilized to provide a session identifier, arranged in accordance with at least some embodiments described herein.

FIG. 10 illustrates computer program products that can be utilized to provide a session identifier in accordance with at least some embodiments described herein. Computer program product 1000 may include a signal bearing medium 1010. Signal bearing medium 1010 may include one or more instructions 1020 that, when executed by, for example, a processor, may provide the functionality described above with respect to FIGS. 1-9. By way of example, instructions 1020 may include: one or more instructions for generating information including at least a part of a next session identifier to be used in a next session between a server and a user device, the next session follows a present session between the server and the user device; one or more instructions for transmitting the information to the server. Thus, for example, referring to FIG. 6, user device 110 may undertake one or more of the blocks shown in FIG. 8 in response to instructions 1020.

Further, by way of example, instructions 1020 may include: one or more instructions for generating information including at least a part of a next session identifier to be used in a next session between a server and a user device, the next session follows a present session between the server and the user device; one or more instructions for transmitting the information to the user device. Thus, for example, referring to FIG. 7, server 120 may undertake one or more of the blocks shown in FIG. 9 in response to instructions 1020.

In some implementations, signal bearing medium 1010 may encompass a computer-readable medium 1030, such as, but not limited to, a hard disk drive (HDD), a compact disk (CD), a digital versatile disk (DVD), a digital tape, memory, etc. In some implementations, signal bearing medium 1010 may encompass a recordable medium 1040, such as, but not limited to, memory, read/write (R/W) CDs, R/W DVDs, etc. In some implementations, signal bearing medium 1010 may encompass a communications medium 1050, such as, but not limited to, a digital and/or an analog communication medium (e.g., a fiber optic cable, a waveguide, a wired communication link, a wireless communication link, etc.). Thus, for example, computer program product 1000 may be conveyed to one or more modules of user device 110 and server 120 by an RF signal bearing medium 1020, where the signal bearing medium 1020 is conveyed by a wireless communications medium 1050 (e.g., a wireless communications medium conforming with the IEEE 802.11 standard).

Figure 11:
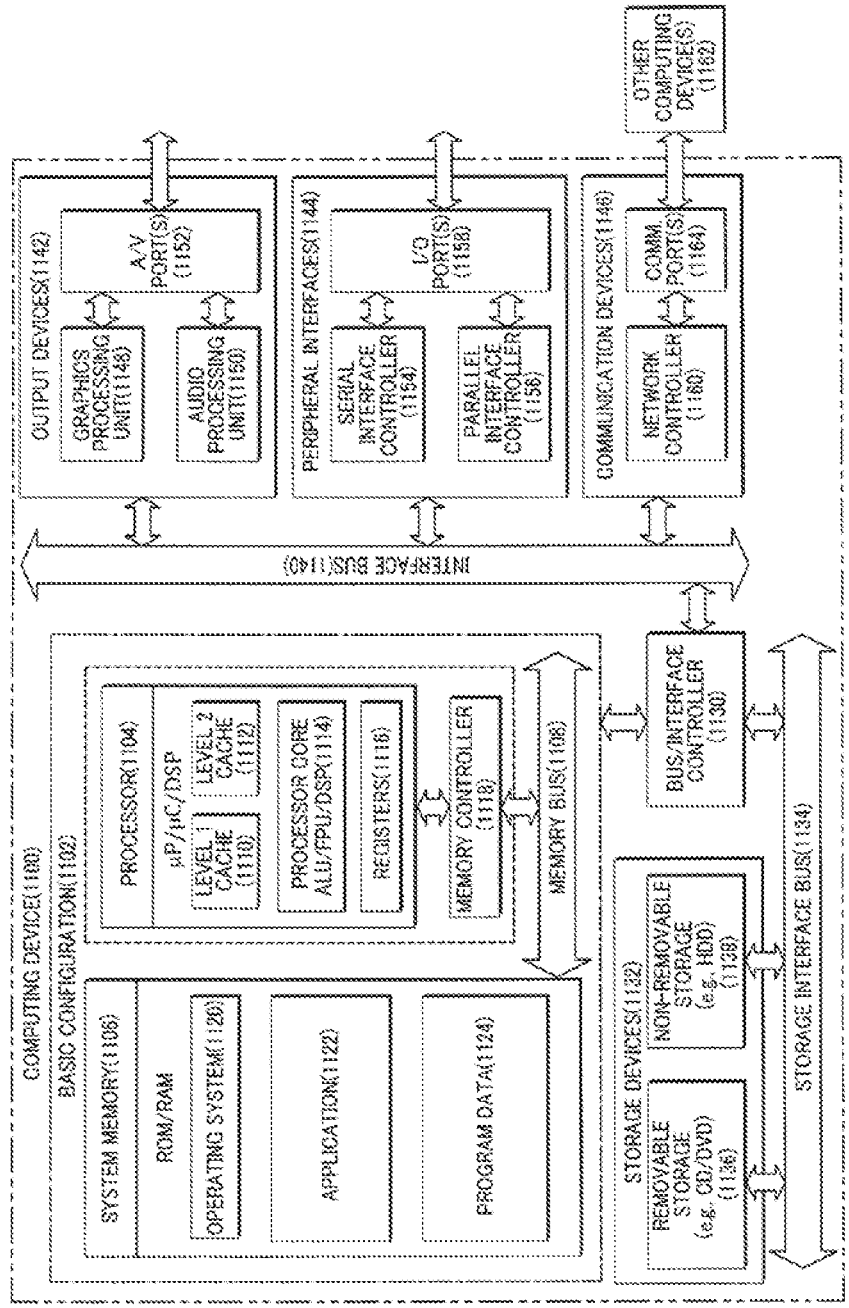
FIG. 11 is a block diagram illustrating an example computing device that can be utilized to provide a session ID, arranged in accordance with at least some embodiments described herein.

FIG. 11 is a block diagram illustrating an example computing device 1100 that can be utilized to provide a session ID in accordance with at least some embodiments described herein. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (µP), a microcontroller (µC), a digital signal processor (DSP), or any combination thereof. Processor 1104 may include one or more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a first device, the method comprising:
generating, by a processor coupled to the first device, a present session identifier to establish a present session between the first device and a second device;
generating, by the processor coupled to the first device, information that includes a split part of a next session identifier to be used in a next session between the first device and the second device and includes a configuration scheme, wherein the next session follows the present session between the first device and the second device, wherein the split part of the next session identifier is distinct from the next session identifier, and wherein the configuration scheme specifies a scheme to combine the split part of the next session identifier with the next session identifier;
determining, by the processor coupled to the first device, whether the second device has a same session identifier as the present session identifier;
establishing, by the processor coupled to the first device, the present session after a determination that the second device has the same session identifier as the present session identifier; and
transmitting, by a transmitter coupled to the first device, the information to the second device,
wherein the information includes a configuration scheme to combine a split part of at least one field of at least one of a plurality of next session identifiers with at least one of the plurality of next session identifiers,
wherein the next session identifier is generated by the second device based on at least two configuration schemes, and wherein each of the at least two configuration schemes corresponds to a session that precedes the next session.

2. The method of claim 1, wherein the next session identifier includes a plurality of fields, and
wherein the information includes at least one field of the plurality of fields of the next session identifier to be used in the next session.

3. The method of claim 1, wherein the information further includes a split part of another session identifier to be used in another session between the first device and the second device, and wherein the other session occurs after the next session.

4. The method of claim 3,
wherein the other session identifier includes a plurality of fields, and
wherein the information includes at least one field of the plurality of fields of the other session identifier.

5. The method of claim 3, wherein: the next session is followed by the other session,
the next session identifier and the other session identifier respectively includes two fields, and
the information includes one field of the next session identifier and one field of the other session identifier.

6. The method of claim 1, wherein the information and the present session identifier are transmitted in a single data packet.

7. The method of claim 1, wherein the first device is a server and the second device is a user device.

8. The method of claim 1, wherein the first device is a user device and the second device is a server.

9. The method of claim 1, further comprising:
storing the information in a storage unit of the first device.

10. A server, the server comprising:
a receiver configured to receive a request to establish a present session from a user device;
a processor configured to:
generate a present session identifier to establish the present session between the server and the user device;
generate information that includes a split part of at least one field of at least one of a plurality of next session identifiers to be used respectively in a plurality of next sessions that follows the present session, wherein each of the plurality of next session identifiers includes a plurality of fields and the split part of the at least one field of the at least one of the plurality of next session identifiers is distinct from each of the plurality of next session identifiers;
determine whether the user device that requests establishment of the present session has a same session identifier as the present session identifier; and
establish the present session after a determination that the user device has the same session identifier as the present session identifier; and
a transmitter configured to transmit the information to the user device,
wherein the information further includes a configuration scheme to combine the split part of the at least one field of the at least one of the plurality of next session identifiers with the at least one of the plurality of next session identifiers,
wherein each of the plurality of next session identifiers is generated by the user device based on at least two configuration schemes, and wherein each of the at least two configuration schemes corresponds to a session that precedes the corresponding next session of the plurality of next sessions.

11. The server of claim 10, further comprising:
a storage unit configured to store the present session identifier and the information.

12. The server of claim 10, wherein the transmitter is further configured to transmit the present session identifier together with the information.

13. The server of claim 12, wherein the transmitter is configured to transmit the present session identifier and the information in a single data packet.

14. The server of claim 10, wherein: each of the present session identifier and the plurality of next session identifiers comprises N fields,
the plurality of next sessions comprises M next sessions from a first next session to an Mth next session and the plurality of next session identifiers comprises M next session identifiers from a first next session identifier to an Mth next session identifier, wherein each of the M next sessions is associated with each of the M next session identifiers,
the information includes any one field among the N fields of each of the M next session identifiers, and
N and M are natural numbers greater than 1, respectively.

15. A user device, comprising:
a processor configured to:
make a request to establish a present session between a server and the user device; generate a present session identifier to establish the present session between the server and the user device;
generate information that includes a split part of at least one field of at least one of a plurality of next session identifiers to be used in a plurality of next sessions that follows the present session, wherein each of the plurality of next session identifiers includes a plurality of fields and the split part of the at least one field of the at least one of the plurality of next session identifiers is distinct from each of the plurality of next session identifiers; and establish the present session between the server and the user device; and
 a transmitter configured to transmit the present session identifier and the information to the server,
 wherein the information further includes a configuration scheme to combine the split part of the at least one field of the at least one of the plurality of next session identifiers with the at least one of the plurality of next session identifiers,
 wherein each of the plurality of next session identifiers is generated by the user device based on at least two configuration schemes, and wherein each of the at least two configuration schemes corresponds to a session that precedes the corresponding next session of the plurality of next sessions.

16. The user device of claim 15, further comprising:
a storage unit configured to store the present session identifier and the information.

17. The user device of claim 15, wherein the transmitter is configured to transmit the present session identifier and the information in a single data packet.

18. The user device of claim 15, wherein: each of the present session identifier and the plurality of next session identifiers comprises N fields,
 the plurality of next sessions comprises M next sessions from a first next session to an Mth next session and the plurality of next session identifiers comprises M next session identifiers from a first next session identifier to an Mth next session identifier, wherein each of the M next sessions is associated with each of the M next session identifiers,
 the information includes any one field among the N fields of each of the M next session identifiers, and
 N and M are natural numbers greater than 1, respectively.

19. A non-transitory computer-readable storage medium having stored thereon computer-executable instructions that, in response to execution, cause a first device to perform operations that comprise:
 generate, by a processor coupled to the first device, a present session identifier to establish a present session between the first device and a second device;
 generate, by the processor coupled to the first device, information that includes a split part of a next session identifier to be used in a next session between the first device and the second device and includes a configuration scheme, the next session that follows the present session between the first device and the second device, wherein the split part of the next session identifier is distinct from the next session identifier, and wherein the configuration scheme specifies a scheme to combine the split part of the next session identifier with the next session identifier;
 determine, by the processor coupled to the first device, whether the second device has a same session identifier as the present session identifier;
 establish, by the processor coupled to the first device, the present session after a determination that the second device has the same session identifier as the present session identifier; and
 transmit, by a transmitter coupled to the first device, the information to the second device,
 wherein the information includes a configuration scheme to combine a split part of at least one field of at least one of a plurality of next session identifiers with at least one of the plurality of next session identifiers,
 wherein the next session identifier is generated by the second device based on at least two configuration schemes, and wherein each of the at least two configuration schemes corresponds to a session that precedes the next session.

20. The non-transitory computer-readable storage medium of claim 19, wherein the next session identifier includes a plurality of fields, and
 wherein the information includes at least one field of the plurality of fields of the next session identifier to be used in the next session.

21. The non-transitory computer-readable storage medium of claim 19, wherein the first device is a server and the second device is a user device.

22. The non-transitory computer-readable storage medium of claim 19, wherein the first device is a user device and the second device is a server.

* * * * *

UNITED STATES PATENT AND TRADEMARK OFFICE
CERTIFICATE OF CORRECTION

PATENT NO. : 9,712,566 B2  Page 1 of 1
APPLICATION NO. : 13/575815
DATED : July 18, 2017
INVENTOR(S) : Jung It is certified that error appears in the above-identified patent and that said Letters Patent is hereby corrected as shown below:

In the Specification

In Column 3, Line 63, delete "G-bit" and insert -- 6-bit --, therefor.

In Column 5, Line 5, delete "G-bit" and insert -- 6-bit --, therefor.

In Column 5, Line 66, delete "G-bit" and insert -- 6-bit --, therefor.

In Column 8, Line 21, delete "G-bit" and insert -- 6-bit --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*